United States Patent [19]

Wilson et al.

[11] Patent Number: 4,853,197

[45] Date of Patent: Aug. 1, 1989

[54] CRYSTALLINE METAL ALUMINOPHOSPHATES

[75] Inventors: Stephen T. Wilson, Shrub Oak, N.Y.; William C. Mercer, Brookfield, Conn.

[73] Assignee: UOP, Des Plaines, Ill.

[21] Appl. No.: 58,032

[22] Filed: Jun. 4, 1987

[51] Int. Cl.[4] ............................................. C01B 25/26
[52] U.S. Cl. ..................................... 423/306; 502/208
[58] Field of Search ............... 423/305, 306, 118, 122, 423/328, 329; 502/162, 164, 208, 214

[56] References Cited

U.S. PATENT DOCUMENTS

| | | | |
|---|---|---|---|
| 4,310,440 | 1/1982 | Wilson et al. | 252/435 |
| 4,554,143 | 11/1985 | Messina et al. | 423/306 |
| 4,567,029 | 1/1986 | Wilson et al. | 423/306 |
| 4,623,530 | 11/1986 | Cullo et al. | 423/331 |
| 4,639,358 | 1/1987 | Derouane et al. | 423/329 |
| 4,640,829 | 2/1987 | Rubin | 423/328 |
| 4,729,979 | 3/1988 | Zletz | 502/202 |

FOREIGN PATENT DOCUMENTS 0141662  2/1984  European Pat. Off. .
2155916A 10/1985  United Kingdom .

OTHER PUBLICATIONS

Flanigen, E. M., and Grose, R. W., "Phosphorus Substitution in Zeolite Frameworks", Molecular Sieve Zeolites–I, Advances in Chemistry Series 101, pp. 76 to 101 (1971).

Bond, Geoffrey C. et al., "Incorporation of Zinc in an Aluminophosphate Microporous Phase", Journal of Chemical Society, Chem. Communication, pp. 1056 to 1057 (1985).

Pyke, David R. et al., "Chemical Modification of Crystalline Microporous Aluminium Phosphates", Applied Catalysts, vol. 18, pp. 173 to 190 (1985).

Tapp, Neville J. et al., "Substitution of Divalent Cobalt into Aluminophosphate Molecular Sieves", Journal of Chemical Society, Chem. Communication, pp. 1801 to 1803 (1985).

*Primary Examiner*—John Doll
*Assistant Examiner*—R. Bruce Breneman
*Attorney, Agent, or Firm*—Thomas K. McBride; Eugene I. Snyder; Frank S. Molinaro

[57] ABSTRACT

Crystalline microporous metal aluminophosphates wherein the metal is at least one of Co, Mg, Mn, Fe and Zn are provided having the −43, and −50 structures.

20 Claims, 3 Drawing Sheets

CRYSTALLINE METAL ALUMINOPHOSPHATES

FIELD OF THE INVENTION

The present invention relates to crystalline microporous metal aluminophosphates of particular structures. More particularly the invention relates to magnesium aluminophosphates, zinc aluminophosphates, cobalt aluminophosphates, iron aluminophosphates and manganese aluminophosphates. These structures are referred to as 43 and 50 structures.

BACKGROUND OF THE INVENTION

A recently reported class of microporous compositions and the first framework oxide molecular sieves synthesized without silica, are the crystalline aluminophosphate compositions disclosed in U.S. Pat. No. 4,310,440 issued Jan. 12, 1982 to Wilson et al. These materials are formed from $AlO_2$ and $PO_2$ tetrahedra and have electrovalently neutral frameworks as in the case of silica polymorphs. Unlike the silica molecular sieve, silicalite, which is hydrophobic due to the absence of extra-structural cations, the aluminophosphate molecular sieves are moderately hydrophilic, apparently due to the difference in electronegativity between aluminum and phosphorus. Their intracrystalline pore volumes and pore diameters are comparable to those known for zeolites and silica molecular sieves.

In commonly assigned U.S. Pat. No. 4,567,029, issued on Jan. 28, 1986, a novel class of crystalline microporous metal aluminophosphate compositions are described which contain as lattice constituents in addition to $AlO_2$ and $PO_2$ structural units, one or more of the metals Mg, Mn, Co, and Zn in tetrahedral coordination with oxygen atoms. This patent is herein incorporated by reference. The metal aluminophosphate compositions (hereinafter "MeAPO") have an essential empirical chemical composition, on an anhydrous basis, of:

$$mR: (M_xAl_yP_z)O_2$$

wherein "R" represents at least one organic templating agent present in the intracrystalline pore system; "m" represent the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved, "x", "y", and "z" represent the mole fractions of the metal "M", (i.e. magnesium, manganese, zinc and cobalt), aluminum and phosphorus, respectively, present as tetrahedral oxides, said mole fractions being such that they are within the tetragonal compositional area defined by points A, B, C and D of the ternary diagram appearing as FIG. 1 in the patent. The said points A, B, C and D representing the following values for "xo, "y", and "z":

| Point | Mole Fraction | | |
|-------|------|------|------|
|       | x    | y    | z    |
| A     | 0.01 | 0.60 | 0.39 |
| B     | 0.01 | 0.39 | 0.60 |
| C     | 0.35 | 0.05 | 0.60 |
| D     | 0.35 | 0.60 | 0.05 |

When synthesized in accordance with the process disclosed in the patent, the minimum value of "m" in the formula above is 0.02. In a preferred sub-class of the metal aluminophosphates of this invention, the values of "x", "y" and "z" in the formula above are confined to those within the tetragonal compositional area defined by the points a, b, c and d of the ternary diagram appearing as FIG. 2 of the patent, the said points a, b, c, and d representing the following values for "x", "y" and "z":

| Point | Mole Fraction | | |
|-------|------|------|------|
|       | x    | y    | z    |
| a     | 0.01 | 0.52 | 0.47 |
| b     | 0.01 | 0.39 | 0.60 |
| c     | 0.25 | 0.15 | 0.60 |
| d     | 0.25 | 0.40 | 0.35 |

The specific structures disclosed in U.S. Pat. No. 4,567,029, are the MeAPO-5, MeAPO-11, MeAPO-12, MeAPO-14, MeAPO-16, MeAPO-17, MeAPO-20, MeAPO-34, MeAPO-35, MeAPO-36, MeAPO-39, MeAPO-44 and MeAPO-47.

In commonly assigned U.S. Pat. No. 4,554,143, issued on Nov. 19, 1985, a novel class of crystalline microporous ferroaluminophosphate compositions are described which contain as lattice constituents in addition to $AlO_2$ and $PO_2$ structural units, ferric and/or ferrous iron in tetrahedral coordination with oxygen atoms. This patent is herein incorporated by reference. The ferroaluminophosphate compositions (hereinafter "FAPO") have an essential empirical chemical composition, on an anhydrous basis, of:

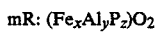

$$mR: (Fe_xAl_yP_z)O_2$$

wherein "R" represents at least one organic templating agent present in the intracrystalline pore system; "m" represent the moles of "R" present per mole of $(Fe_xAl_yP_z)O_2$ and has a value of from zero to 0.3, the maximum value in each case depending upon the molecular dimensions of the templating agent and the available void volume of the pore system of the particular ferroaluminophosphate involved, "x", "y", and "z" represent the mole fractions of iron, aluminum and phosphorus, respectively, present as tetrahedral oxides, said mole fractions being such that they are within the tetragonal compositional area defined by points A, B, C and D of the ternary diagram appearing as FIG. 1 of the patent. The said points A, B, C and D representing the following values for "x", "y", and "z":

| Point | Mole Fraction | | |
|-------|------|------|------|
|       | x    | y    | z    |
| A     | 0.01 | 0.60 | 0.39 |
| B     | 0.01 | 0.39 | 0.60 |
| C     | 0.35 | 0.05 | 0.60 |
| D     | 0.35 | 0.60 | 0.05 |

When synthesized in accordance with the process disclosed in the patent, the minimum value of "m" in the formula above is 0.02. In a preferred sub-class of the ferroaluminophosphates of this invention, the values of "x", "y" and "z" in the formula above are confined to those within the tetragonal compositional area defined by the points a, b, c and d of the ternary diagram appearing as FIG. 2 of the patent, the said points a, b, c, and d representing the following values for "x", "y" and "z":

| Point | Mole Fraction | | |
|---|---|---|---|
| | x | y | z |
| a | 0.01 | 0.52 | 0.47 |
| b | 0.01 | 0.39 | 0.60 |
| c | 0.25 | 0.15 | 0.60 |
| d | 0.25 | 0.40 | 0.35 |

The specific structures disclosed in U.S. Pat. No. 4,554,143, are the FAPO-5, FAPO-11, FAPO-16, FAPO-17, FAPO-18, FAPO-34, and FAPO-35.

SUMMARY OF THE INVENTION

By this invention, novel structures for MeAPO and FAPO are provided. These structures are the −43 and −50 structures as hereinafter defined.

DISCUSSION OF CRYSTALLINE STRUCTURES

Crystalline microporous aluminophosphates exhibit lattice structures. To identify the various structural species, each species is assigned a number. Hence, CoAPO-43 will be characterized as having the same structure as MAPO-43 (magnesium aluminophosphate), MnAPO-43 and FAPO-43. These similar structures are typically determined by X-ray powder diffraction techniques and the intensities of key bands are used for their identification.

As used herein, a MeAPO-43 or FAPO-43 shall have the X-ray diffraction pattern as shown in Table 43S:

TABLE 43S

| $2\theta$ | d,(Å) | 100I/Io |
|---|---|---|
| 12.4 | 7.14–7.17 | VS |
| 17.3–17.4 | 5.10–5.12 | W |
| 21.5–21.6 | 4.12–4.13 | M |
| 27.6–27.7 | 3.22–3.23 | W-M |
| 28.1–28.2 | 3.16–3.18 | W |
| 33.1–33.2 | 2.701–2.706 | VW |

In some of the X-ray patterns reported, the relative intensities of the d-spacings are indicated by the notations VS, S, M, W and VW which represent very strong, strong, medium, weak and very weak respectively.

MeAPO-50 or FAPO-50 shall have the X-ray diffraction pattern as shown in Table 50S:

TABLE 50S

| $2\theta$ | d,( ) | 100I/Io |
|---|---|---|
| 7.8 | 11.4 | W-VW |
| 8.0–8.1 | 10.9–11.1 | VS |
| 9.8–9.9 | 8.93–9.03 | W |
| 23.5–23.6 | 3.77–3.79 | W-M |
| 24.1–24.3 | 3.66–3.69 | W |
| 26.2 | 3.40 | VW |

DETAILED DESCRIPTION OF THE INVENTION

Figure 1:
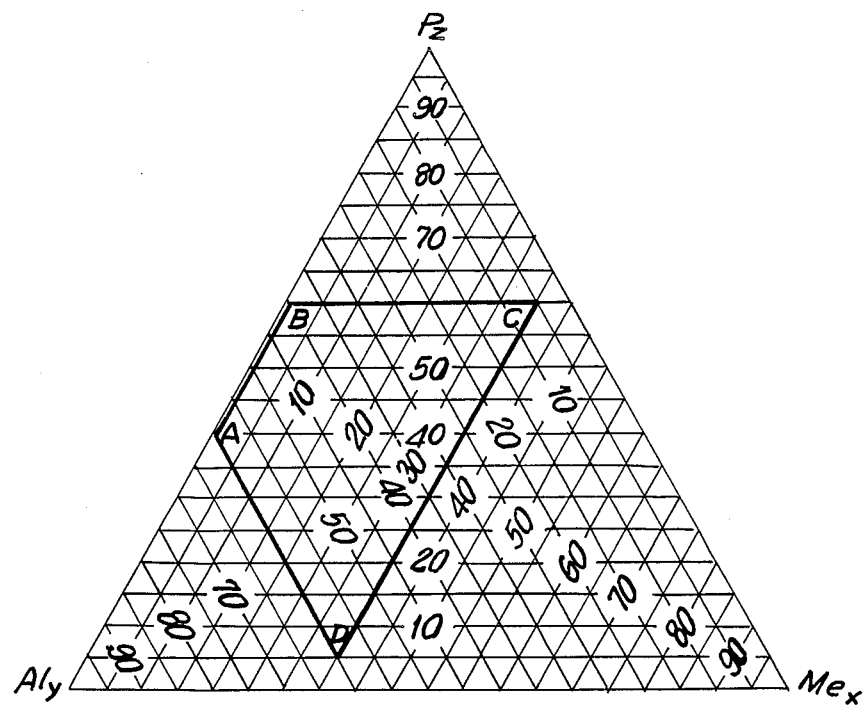
FIG. 1 is a ternary diagram wherein parameters relating to the instant compositions are set forth as mole fractions.

Microporous crystalline metal aluminophosphates in which the substituent metal comprises one or more metals of the group magnesium, manganese, zinc, iron and cobalt, exhibit adsorption, ion-exchange and/or catalytic properties similar to the prior known aluminosilicate, aluminophosphate and silicoaluminophosphate molecular sieve compositions. Members of this class of compositions have a three-dimensional microporous crystal framework structure of $MO_2^{-2}$ and/or $MO_2^{-1}$, $AlO_2^-$ and $PO_2^+$ tetrahedral units and have an essential empirical chemical composition, on an anhydrous basis, of:

$$mR: (M_xAl_yP_z)O_2$$

wherein "R" represents at least one organic templating agent present in the intracrystalline pore system; "m" represent the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved, "x", "y", and "z" represent the mole fractions of the metal "M", (i.e. iron, magnesium, manganese, zinc and cobalt), aluminum and phosphorus, respectively, present as tetrahedral oxides, said mole fractions being such that they are within the tetragonal compositional area defined by points A, B, C and D of the ternary diagram which is FIG. 1 of the drawings. The said points A, B, C and D representing the following values for "x", "y", and "z":

| Point | Mole Fraction | | |
|---|---|---|---|
| | x | y | z |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

Figure 2:
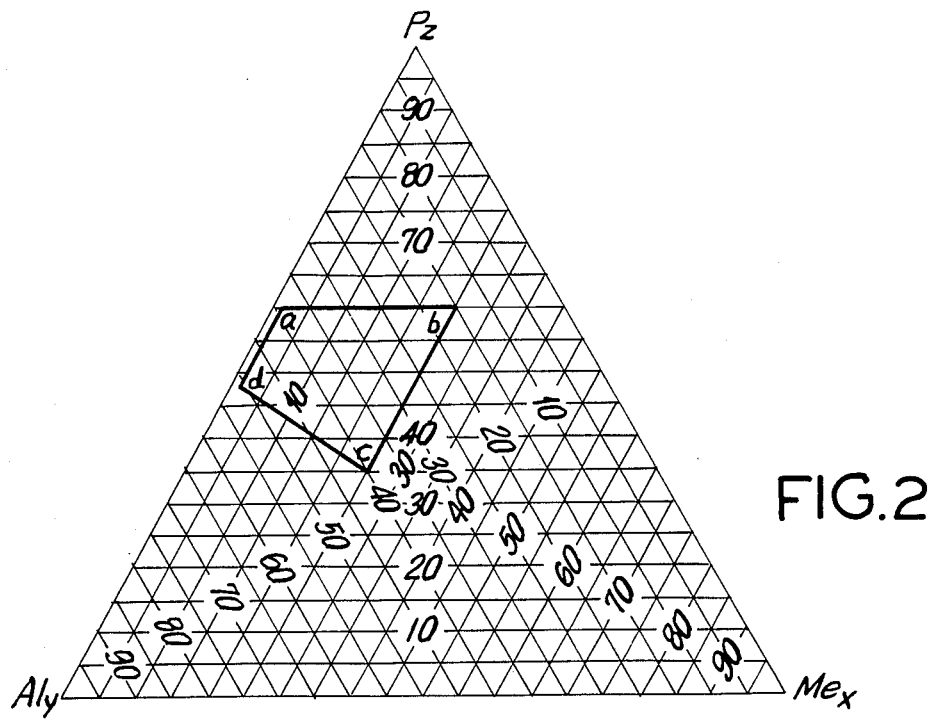
FIG. 2 is a ternary diagram wherein parameters relating to preferred compositions are set forth as mole fractions.

When synthesized in accordance with the process described herein, the minimum value of "m" in the formula above is 0.02. In a preferred sub-class of the metal aluminophosphates of this invention, the values of "x", "y" and "z" in the formula above are confined to those within the tetragonal compositional area defined by the points a, b, c and d of the ternary diagram which is FIG. 2 of the drawings, the said points a, b, c, and d representing the following values for "x", "y" and "z":

| Point | Mole Fraction | | |
|---|---|---|---|
| | x | y | z |
| a | 0.01 | 0.52 | 0.47 |
| b | 0.01 | 0.39 | 0.60 |
| c | 0.25 | 0.15 | 0.60 |
| d | 0.25 | 0.40 | 0.35 |

While it believed that the metal, Al and P framework constituents are present in tetrahedral coordination with oxygen, it is theoretically possible that some minor fraction of these framework constituents are present in coordination with five or six oxygen atoms. It is not, moreover, necessarily the case that all of the metal, Al and/or P content of any given synthesized product be a part of the framework in the aforesaid types of coordination with oxygen. Some of each constituent may be merely occluded or in some as yet undetermined form and may or may not be structurally significant.

This specification uses the shorthand designations established in the art, e.g., in U.S. Pat. Nos. 4,554,143 and 4,567,029, wherein "MeAPO" refers to compositions containing zinc, manganese, magnesium and/or cobalt. Also in those cases where the metal "Me" in the composition is magnesium, the acronym MAPO is applied to the composition. Similarly ZAPO, MnAPO and CoAPO are applied to the compositions which contain zinc, manganese and cobalt respectively. "FAPO" refers to those compositions containing iron. To identify the various structural species which make up each of the subgeneric classes MAPO, ZAPO, CoAPO and MnAPO, each species is assigned a number and is identified, for example, as ZAPO-43, MAPO-43, CoAPO-50 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancing ions for $AlO_2^-$ and/or $MO_2^{-2}$ tetrahedra not associated with $PO_2^+$ tetrahedra or an organic ion derived from the organic templating agent.

The metal aluminophosphates of this invention include: CoAPO-43, CoAPO-50, MAPO-43, MAPO-50, MnAPO-43, MnAPO-50, ZAPO-43, ZAPO-50, FAPO-43, and FAPO-50.

In general the metal aluminophosphates are synthesized by hydrothermal crystallization from a reaction mixture containing reactive sources of the metal, alumina and phosphate, an organic templating, i.e., structure-directing, agent, preferably a compound of an element of Group VA of the Periodic Table, and optionally an alkali metal. The reaction mixture is placed in a sealed pressure vessel, preferably lined with an inert plastic material such as polytetrafluoroethylene and heated, preferably under autogenous pressure at a temperature between 100° C. and 225° C., and preferably between 100° C. and 200° C. until crystals of the metal aluminophosphate product are obtained, usually a period of from 4 hours to 2 weeks. The product is recovered by any convenient method such as centrifugation or filtration.

Figure 3:
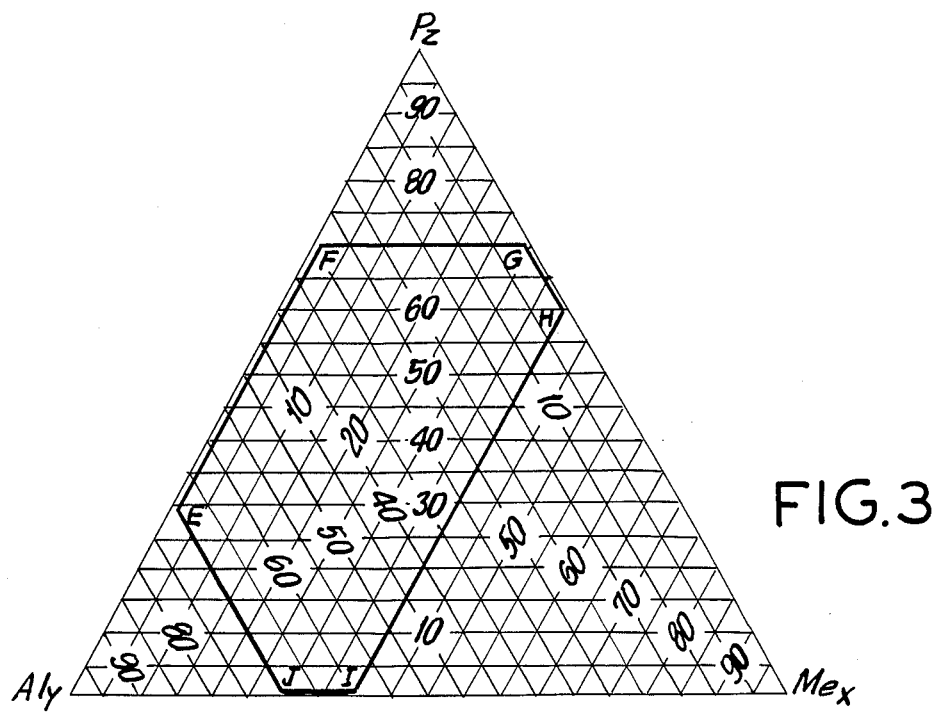
FIG. 3 is a ternary diagram wherein parameters relating to the reaction mixtures employed in the preparation of the compositions of this invention are set forth as mole fractions.

In synthesizing the MeAPO and FAPO compositions of the present invention, it is preferred to employ a reaction mixture composition expressed in terms of molar ratios as follows:

$$aR: (M_xAl_yP_z)O_2:bH_2O$$

wherein "R" is an organic templating agent; "a" has a value great enough to constitute an effective concentration of "R" and is within the range of greater than 0 to 3; "b" has a value of from zero to 500, preferably 2 to 30; "M" represents one or more metals of the group zinc, magnesium, manganese, iron and cobalt, "x", "y" and "z" represent the mole fractions, respectively, of "M", aluminum and phosphorus in the $(M_xAl_yP_z)O_2$ constituent, and each has a value of at least 0.01, and being within the hexagonal compositional areas defined by points E, F, G, H, I and J which is shown in FIG. 3 of the drawings, the said points, E, F, G, H, I and J representing the following values for "x", "y" and "z":

| Point | Mole Fraction | | |
|---|---|---|---|
| | x | y | z |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| I | 0.40 | 0.59 | 0.01 |
| J | 0.29 | 0.70 | 0.01 |

In the foregoing expression of the reaction composition, the reactants are normalized with respect to a total of $(M+Al+P)=(x+y+z)=1.00$ mole, whereas in many of the working examples appearing hereinafter the reaction mixtures are expressed in terms of molar oxide ratios normalized to 1.00 mole of $P_2O_5$. This latter form is readily converted to the former form by routine calculations. Thus for example, in a reaction mixture expressed in terms of molar oxide ratios as 2 TPAOH:0.4 MgO:0.8 $Al_2O_3:P_2O_5:5OH_2O$ the molar ratios of Mg, Al and P are 0.4 Mg: 1.6 Al: 2.0 P, and $(Mg+Al+P)=4.0$. The mole fraction of x, y and z are computed by dividing each coefficient and the molar proportions of water and templating agent, by 4.0. This results in:

2.0/4.0 TPAOH: $(Mg_{0.4/4.0} Al_{1.6/4.0} P_{2.0/4.0})O_2$:50/4.0 $H_2O$ or 0.5 TPAOH: $(Mg_{0.1}Al_{0.4}P_{0.5})O_2$:12.5$H_2O$

In forming the reaction mixture from which the present metal aluminophosphates are crystallized the organic templating agent can be any of those heretofore proposed for use in the synthesis of conventional zeolite aluminosilicates and microporous aluminophosphates. In general these compounds contain elements of Group VA of the Periodic Table of Elements, particularly nitrogen, phosphorus, arsenic and antimony, preferably N or P and most preferably N, which compounds also contain at least one alkyl or aryl group having from 1 to 8 carbon atoms. Representative nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents, (1) can produce mixtures of the desired metal aluminophosphates, or, (2) the more strongly directing templating species may control the course of the reaction with the other templating species serving primarily to establish the pH conditions of the reaction gel, or, (3) may produce an entirely different species not observed with either of the species alone. Representative templating agents include tetramethylammonium, tetraethylammonium, tetrapropylammonium, or tetrabutylammonium ions; di-n-propylamine; tripropylamine; triethylamine; triethanolamine; piperidine; cyclohexylamine; 2-methylpyridine; N,N-dimethylbenzylamine; N,N-dimethylethanolamine; choline; N,N'-dimethylpiperazine; 1,4-diazabicyclo (2,2,2) octane; N-methyldiethanolamine, N-methylethanolamine; N-methylpiperidine; 3-methylpiperidine; N-methylcyclohexylamine; 3-methylpyridine; 4-methylpyridine; quinculidine; N,N'-dimethyl-1,4-diazabicyclo (2,2,2) octane ion; di-n-butylamine, neopentylamine; di-n-pentylamine; isopropylamine; t-butylamine; ethylenediamine; pyrolidine; and 2-imidazolidone.

As will be readily apparent from the illustrative Examples set forth hereinafter, not every templating agent will direct the formation of every species of metal aluminophosphate, i.e., a single templating agent can, with proper manipulation of the reaction conditions, direct the formation of several MeAPO or FAPO compositions, and a given MeAPO or FAPO composition can be produced using several different templating agents.

The most suitable phosphorus source yet found for the present process is phosphoric acid, but organic phosphates such as triethyl phosphate have been found satisfactory, and so also have crystalline or amorphous aluminophosphates such as the AlPO4 composition of U.S. Pat. No. 4,310,440, herein incorporated by reference. Organo-phosphorus compounds, such as tetrabutylphosphonium bromide do not, apparently serve as reactive sources of phosphorus, but these compounds do function as templating agents. Conventional phosphorus salts such as sodium metaphosphate, may be used, at least in part, as the phosphorus source, but are not preferred.

The preferred aluminum source is either an aluminum alkoxide, such as aluminum isoproproxide, or pseudo-boehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

The metals zinc, cobalt, magnesium and manganese can be introduced into the reaction system in any form which permits the formation in situ of reactive divalent ions of the respective metals. Iron can be introduced into the reactive system in any form which permits the formation in situ of ferrous or ferric ions. Advantageously salts, oxides or hydroxides of the metals are employed such as cobalt chloride hexahydrate, alpha cobaltous iodide, cobaltous sulfate, cobalt acetate, cobaltous bromide, cobaltous chloride, zinc acetate, zinc bromide, zinc formate, zinc iodide, zinc sulfate heptahydrate, magnesium acetate, magnesium bromide, magnesium chloride, magnesium iodide, magnesium nitrate, magnesium sulfate, manganous acetate, manganous bromide, manganous sulfate, iron sulfate, iron acetate, iron nitrate, freshly precipitated iron oxide, gamma FeOOH, and the like.

While not essential to the synthesis of MeAPO compositions, it has been found that in general, stirring or other moderate agitation of the reaction mixture and/or seeding the reaction mixture with seed crystals of either the MeAPO or FAPO species to be produced or a topologically similar aluminophosphate or aluminosilicate composition, facilitates the crystallization procedure.

After crystallization the MeAPO or FAPO product is isolated and advantageously washed with water and dried in air. The as-synthesized MeAPO or FAPO contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular MeAPO or FAPO species. As a general rule the templating agent, and hence the occluded organic species, is too large to move freely through the pore system of the MeAPO or FAPO product and must be removed by calcining the MeAPO or FAPO at temperatures of 200° C. to 700° C. to thermally degrade the organic species. In a few instances the pores of the MeAPO or FAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein and in the claims does not include the condition of the MeAPO or FAPO phase wherein the organic moiety occupying the intracrystalline pore system as a result of the hydrothermal crystallization process has been reduced by post-synthesis treatment such that the value of "m" in the composition formula

has a value of less than 0.02. The other symbols of the formula are as defined hereinabove. In those preparations in which an aluminum alkoxide is employed as the source of aluminum, the corresponding alcohol is necessarily present in the reaction mixture since it is a hydrolysis product of the alkoxide. It has not been determined whether this alcohol participates in the syntheses process as a templating agent. For the purpose of this application, however, this alcohol is arbitrarily omitted from the class of templating agents, even if it is present in the as-synthesized MeAPO or FAPO material.

Since the MeAPO compositions are formed from $AlO_2$, $PO_2$ and $MO_2$ tetrahedral units which, respectively, have a net change of $-1$, $+1$, and $-2$, the matter of cation exchangeability is considerably more complicated than in the case of zeolitic molecular sieves in which, ideally, there is a stoichiometric relationship between $AlO_2$ tetrahedra and charge-balancing cations. In the MeAPO compositions, and $ALO_2^-$ tetrahedron can be balanced electrically either by association with a $PO_2^+$ tetrahedron or a simple cation such as an alkali metal cation, a cation of the metal "M" present in the reaction mixture, or an organic cation derived from the templating agent. Similarly an $MO_2^{-2}$ tetrahedron can be balanced electrically by association with $PO_2^+$ tetrahedra, a cation of the metal "M", organic cations derived from the templating agent, or other divalent or polyvalent metal cations introduced from an extraneous source.

Since the FAPO compositions are formed from $AlO_2^-$, $PO_2^+$, $FeO_2^-$, and/or $FeO_2^{-2}$ units the matter of cation exchangeability is considerably more complicated than in the case of zeolitic molecular sieves in which, ideally, there is a stoichiometric relationship betweeen $AlO_2$ tetrahedra and charge-balancing cations. In the FAPO compositions, an $AlO_2^-$ tetrahedron can be balanced electrically either by association with a $PO_2^+$ tetrahedron or a simple cation such as an alkali metal cation, a $FE^{+2}$ or $Fe^{+3}$ cation present in the reaction mixture, or an organic cation derived from the templating agent. Similarly an $FeO_2^-$ or $FeO_2^{-2}$ tetrahedron can be balanced electrically by association with $PO_2^+$ tetrahedron, a $Fe^{+2}$ or $Fe^{+3}$ cation, an organic cation derived from the templating agent, or other metal cation introduced from an extraneous source.

It has also been postulated that nonadjacent $AlO_2^-$ and $PO_2^+$ tetrahedral pairs can be balanced by $Na^+$ and $OH^-$ respectively [Flanigen and Grose, Molecular Sieve Zeolites-I, ACS, Washington, DC (1971)].

In any event, all of the MeAPO and FAPO compositions have uniform pore diameters which are inherent in the lattice structure of each species and which are at least about 3A in diameter. Ion exchange is ordinarily possible only after the organic moiety present as a result of synthesis has been removed from the pore system. Dehydration to remove water present in the as-synthesized MeAPO and FAPO compositions can usually be accomplished, to some degree at least, in the usual manner without removal of the organic moiety, but the absence of the organic species greatly facilitates adsorption and desorption procedures.

The invention is illustrated by the following Examples. Unless otherwise stated, in each example wherein a hydrated aluminum oxide is specified as a reagent, the reagent employed was a commercially available pseudo-boehmite phase containing either 75.1 wt. % $Al_2O_3$ and 24.9 wt. % water or 74.2 wt. % $Al_2O_3$ and 25.8 wt. % water, the former being designated hydrated aluminum oxide, (I) and the latter, hydrated aluminum oxide (II). Also in each example the stainless steel reaction vessel utilized was lined with the inert plastic material, polytetrafluoroethylene, to avoid contamination of the reaction mixture. In general, the final reaction mixture from which each MeAPO and FAPO composition is crystallized is prepared by forming mixtures of less than all of the reagents and thereafter incorporating into these mixtures addition reagents either singly or in the form of other intermediate mixtures of two or more reagents. In some instances the reagents admixed retain their identity in the intermediate mixture and in other cases some or all of the reagents are involved in chemical reactions to produce new reagents. The term "mixture" is applied in both cases. Further, unless otherwise specified, each intermediate mixture as well as the final reaction mixture was stirred until substantially homogeneous.

Where reaction products were subjected to X-ray analysis, the X-ray patterns were obtained using standard X-ray powder diffraction techniques. The radiation source was a high-intensity, copper target, X-ray tube operated at 50 Kv and 40 ma. The diffraction pattern from the copper K radiation and graphite monochromator is suitably recorded by an X-ray spectrometer scintillation counter, pulse height analyzer and strip chart recorder. Flat compressed powder samples are scanned at 2° (2 theta) per minute, using a two second time constant. Interplanar spacings (d) in Angstrom units are obtained from the position of the diffraction peaks expressed as $2\theta$ where $\theta$ is the Bragg angle as observed on the strip chart. Intensities were determined from the heights of diffraction peaks after subtracting background. "$I_o$" being the intensity of the strongest line or peak, and "I" being the intensity of each of the other peaks.

As will be understood by those skilled in the art the determination of the parameter 2 theta is subject to both human and mechanical error, which in combination, can impose an uncertainty of about ±0.4° on each reported value of 2 theta. This uncertainty is, of course, also manifested in the reported values of the d-spacings, which are calculated from the 2 theta values. This imprecision is general throughout the art and is not sufficient to preclude the differentiation of the present crystalline materials from each other and from the compositions of the prior art.

In certain instances hereinafter in the illustrative examples, the purity of a synthesized product is assessed with reference to its X-ray powder diffraction pattern. Thus, for example, if a sample of MAPO-50 is stated to be "pure MAPO-50", it is intended only that the X-ray pattern of the sample is free of lines attributable to crystalline impurities, not that there are no amorphous materials present.

The following examples are provided to illustrate the invention and are not to be construed as limiting thereof:

ABBREVIATIONS USED

In the following examples the MeAPO-43, MeAPO-50, FAPO-43 or FAPO-50, compositions were prepared using numerous reagents. The reagents employed and their abbreviations, if any, along with other abbreviations used are as follows:

(a) EDAX: Energy Dispersive Analysis by X-ray;
(b) LHSV: Liquid Hourly Space Velocity;
(c) LOI: Loss On Ignition;
(d) $H_3PO_4$: 85 weight percent aqueous phosphoric acid;
(e) $Pr_2NH$: di-n-propylamine, $(C_3H_7)_2NH$;
(f) SEM: Scanning Electron Microscope; and
(g) TEFLON (polytetrafluoroethylene): is a trademark of E. I. du pont de Nemours & Co, Wilmington, Del., U.S.A.

EXAMPLE 1

(Preparation of CoAPO-43)

(a) An initial mixture was prepared by combining 46.2 grams of 85% orthophosphoric acid ($H_3PO_4$) and 46.2 grams of water, to which was added 25.2 grams of a hydrated aluminum oxide (70.6 wt. % $Al_2O_3$, 29.6 wt. % $H_2O$, pseudo-boehmite). A solution prepared by dissolving 14.9 grams of cobalt acetate tetrahydrate ($Co(CH_3CO_2)_2.4\ H_2O$) in 105.6 grams of $H_2O$ was added to this original mixture and to the resulting mixture was added 40.5 grams of di-n-propylamine ($C_6H_{15}N$) followed by the addition of 5 wt. % AlPO$_4$—41 seed (dry oxide basis), to form the final reaction mixture having a composition in terms of molar oxide ratios of: 2.0 $C_6H_{15}N$ . 0.3 CoO . 0.8 $Al_2O_3$.0.6 $CH_3COOH$ . 50 $H_2O$.

The reaction mixture was placed in a sealed Teflon-lined stainless steel pressure vessel and heated in an oven at 150° C. under autogenous pressure for 168 hours. The solid product was collected by centrifugation and washed with water. During the washing procedure the solids were screened into several different size fractions then dried in air at room temperature. The portion of solids that passed through a 60 mesh screen and was retained by a 325 mesh screen was subjected to X-ray analysis and found to be a mixture. The major component of the mixture exhibited an x-ray powder diffraction pattern characterized by the following data:

TABLE A

| $2\theta$ | d,(Å) | $100I/I_o$ |
|---|---|---|
| 12.4 | 7.15 | 100 |
| 17.4 | 5.11 | 10 |
| 21.5 | 4.12 | 41 |
| 27.6 | 3.23 | 40 |
| 28.2 | 3.17 | 20 |
| 32.8 | 2.73 | 9 |
| 33.1 | 2.70 | 7 |
| 45.4 | 2.00 | 3 |
| 51.1 | 1.79 | 4 |
| 53.1 | 1.72 | 5 |

The portion of solids that did not pass through the 60 mesh screen also contained CoAPO-43 as a major component as judged by x-ray powder diffraction. EDAX (energy dispersive analysis by x-ray) microprobe analysis, performed in conjunction with SEM (scanning electron microscope) study, on clean crystals with a crystal morphology characteristic of CoAPO-43, gave the following analysis based on relative peak heights:

| Average of Spot Probes | |
|---|---|
| Co | 0.03 |
| Al | 0.38 |
| P | 0.59 |

TABLE S-1

| (CoAPO-43 SHORT TABLE) | | |
|---|---|---|
| $2\theta$ | d,(Å) | $100I/I_o$ |
| 12.4 | 7.14–7.15 | 100 |
| 17.3–17.4 | 5.11 | 7–10 |
| 21.5–21.6 | 4.12 | 39–40 |
| 27.6–27.7 | 3.22–3.23 | 38–40 |
| 28.2 | 3.16 | 19–20 |
| 32.8–32.9 | 2.726–2.727 | 9–11 |

TABLE L-1

| (CoAPO-43 LONG TABLE) | | |
|---|---|---|
| $2\theta$ | d,(Å) | $100I/I_o$ |
| 12.4 | 7.14–7.15 | 100 |
| 17.3–17.4 | 5.11 | 7–10 |
| 21.5–21.6 | 4.12 | 39–40 |
| 27.6–27.7 | 3.22–3.23 | 38–40 |
| 28.2 | 3.16 | 19–20 |
| 32.8–32.9 | 2.726–2.727 | 9–11 |
| 33.1–33.1 | 2.700–2.702 | 7–8 |
| 45.4–45.5 | 1.995–1.998 | 3–4 |
| 51.1 | 1.787 | 4–5 |
| 53.1 | 1.724 | 5 |

EXAMPLE 2

(Preparation of CoAPO-50)

(a) A mixture was prepared by combining 23.1 grams of 85% orthophosphoric acid ($H_3PO_4$) and 26.6 grams of water to which was added 11.6 grams of a hydrated aluminum oxide (75.1 wt. % $Al_2O_3$, 24.9 wt. % $H_2O$). A solution prepared by dissolving 7.5 grams cobalt acetate tetrahydrate ($Co(CH_3CO_2)_2 \cdot 4H_2O$) in 50 grams of water was added to this mixture and the resulting mixture combined with 25.3 grams of di-n-propylamine ($C_6H_{15}N$) form the final reaction mixture having a composition in terms of molar oxide ratios of:

2.5 $C_6H_{15}N$:0.30 CoO:0.85 $Al_2O_3$:1.0 $P_2O_5$:0.6 $CH_3COOH$:50 $H_2O$

The reaction mixture was placed in a sealed stainless steel pressure vessel and heated in an oven at 150° C. at autogenous pressure for 184 hours. The solids were recovered by filtration, washed with water, and dried in air at room temperature. The portion of the solids that passed through a 325 mesh screen was subjected to chemical and x-ray analysis.

The x-ray powder diffraction pattern of the analyzed sample was characterized by the following data:

TABLE B

| $2\theta$ | d,(Å) | $100I/I_o$ |
|---|---|---|
| 8.1 | 10.90 | 100 |
| 9.9 | 8.97 | 38 |
| 14.0 | 6.33 | 4 |
| 23.6 | 3.77 | 6 |
| 24.3 | 3.67 | 7 |
| 26.2 | 3.40 | 2 |
| 29.8 | 3.00 | 2 |
| 37.5 | 2.40 | 3 |
| 49.7 | 1.83 | 2 |

The chemical composition was found to be 17.9 wt. % $Al_2O_3$, 38.5 wt. % $P_2O_5$, 16.0 wt. % CoO, 14.9 wt. % C, 3.0 wt. % N, and 26.3 wt. % LOI. Expressed in terms of molar oxide ratios (anhydrous basis), the composition was:

0.76 $C_6H_{15}N$:0.79 CoO:0.65 $Al_2O_3$:1.0 $P_2O_5$ which corresponds to an empirical chemical composition of:

0.19 $C_6H_{15}N$:($Co_{0.19}$ $Al_{0.32}$ $P_{0.49}$)$O_2$

EDAX (energy dispersive analysis by x-ray) microprobe analysis, performed in conjunction with SEM (scanning electron microscope) study, on clean crystals with a crystal morphology characteristic of CoAPO-50, gave the following analysis based on relative peak heights:

| Spot Probe | |
|---|---|
| Co | 0.11 |
| Al | 0.27 |
| P | 0.62 |

TABLE L-2

| (CoAPO-50 LONG TABLE) | | |
|---|---|---|
| $2\theta$ | d,(Å) | $100I/I_o$ |
| 8.10 | 10.9 | 99–100 |
| 9.86–9.87 | 8.97 | 38–100 |
| 14.0–14.5 | 6.12–6.33 | 1–4 |
| 23.6 | 3.77 | 6–10 |
| 24.2–24.3 | 3.66–3.68 | 7–12 |
| 26.2 | 3.40 | 2–4 |
| 29.8 | 3.00 | 2–5 |
| 37.4–37.5 | 2.40 | 3–5 |
| 49.7 | 1.83 | 2–4 |

TABLE S-2

(CoAPO-50 SHORT TABLE)

| $2\theta$ | d,(Å) | 100I/Io |
|---|---|---|
| 8.10 | 10.9 | 99–100 |
| 9.86–9.87 | 8.97 | 38–100 |
| 23.6 | 3.77 | 6–10 |
| 24.2–24.3 | 3.66–3.68 | 7–12 |
| 29.8 | 3.00 | 2–5 |
| 37.4–37.5 | 2.40 | 3–5 |

EXAMPLE 3

(Preparation of CoAPO-50)

(a) A solution prepared by adding 15 grams of cobalt acetate tetrahydrate (Co(CH$_3$CO$_2$)$_2$: 4 H$_2$O) to 100 grams of water was added to a solution of 46.2 grams 75% orthophosphoric acid (H$_3$PO$_4$) and 53.2 grams of water. A mixture was prepared by adding 23.2 grams of a hydrated aluminum oxide (75.1 wt. % Al$_2$O$_3$, 24.9 wt. % H$_2$O) to this solution. The final reaction mixture prepared by adding 50.6 grams of di-n-propylamine (C$_6$H$_{15}$N) to this mixture had a composition in terms of molar oxide ratios of:

2.5 C$_6$H$_{15}$N: 0.30 CoO: 0.85 Al$_2$O$_3$: 1.0 P$_2$O$_5$: 0.6 CH$_3$COOH: 50 H$_2$O

The reaction mixture was placed in a sealed stainless steel pressure vessel and heated in an oven at 150° C. at autogenous pressure for 24 hours. The solids were recovered by filtration, washed with water, and dried in air at room temperature. The material was impure but the major phase had an x-ray pattern essentially identical to that in Example 2.

EXAMPLE 4

(Preparation of MAPO-43)

(a) An initial mixture was prepared by combining 46.2 grams of 85% orthophosphoric acid (H$_3$PO$_4$) and 51.9 grams of water, to which was added 25.2 grams of a hydrated aluminum oxide (70.6 wt. % Al$_2$O$_3$, 29.6 wt. % H$_2$O). A solution prepared by dissolving 12.9 grams of magnesium acetate tetrahydrate (Mg(CH$_3$CO$_2$)$_2$: 4 H$_2$O) in 51.9 grams of water was added to this initial mixture and to the resulting mixture was added 40.5 grams of di-n-propylamine (C$_6$H$_{15}$N) followed by the addition of 2.8 grams AlPO$_4$—41 seed to form the final reaction mixture having a composition in terms of molar oxide ratios (without seed) of:

2.0 C$_6$H$_{15}$N: 0.3 MgO: 0.85 Al$_2$O$_3$ : 1.0 P$_2$O$_5$: 0.6 CH$_3$COOH: 50 H$_2$O

The reaction mixture was placed in a sealed stainless steel pressure vessel and heated in a oven at 150° C. under autogenous pressure for 168 hours. The solids were recovered by centrifugation, washed with water, and dried in air at room temperature. A portion of the solids that passed through a 60 mesh screen but not through a 325 mesh screen was subjected to x-ray and chemical analysis.

The x-ray powder diffraction pattern showed the sample to be a mixture with the major phase being characterized by the following data:

TABLE C

| $2\theta$ | d,(Å) | 100I/Io |
|---|---|---|
| 12.4 | 7.14 | 100 |
| 17.4 | 5.10 | 9 |
| 21.6 | 4.12 | 52 |
| 27.7 | 3.22 | 35 |
| 28.1 | 3.17 | 24 |
| 32.9 | 2.72 | 8 |
| 33.1 | 2.70 | 8 |
| 35.9 | 2.50 | 3 |
| 45.4 | 2.00 | 4 |
| 51.1 | 1.788 | 4 |
| 53.0 | 1.726 | 4 |

The chemical composition was found to be 28.5 wt. % Al$_2$O$_3$, 43.3 wt. % P$_2$O$_5$, 5.7 wt. % MgO, 8.1 wt. % C, 1.4 wt % N, and 22.1 wt. % LOI. Expressed in terms of molar oxide ratios (anhydrous basis), the composition was:

0.37 C$_6$H$_{15}$N: 0.46 MgO: 0.91 Al$_2$O$_3$: 1.0 P$_2$O$_5$ which corresponds to an empirical chemical composition of:

0.09 C$_6$H$_{15}$N: (Mg$_{0.11}$ Al$_{0.43}$P$_{0.47}$O$_2$

EDAX (energy dispersive analysis by x-ray) microprobe analysis, performed in conjunction with SEM (scanning electron microscope) study, on clean crystals with a crystal morphology characteristic of MAPO-43, gave the following analysis based on relative peak heights:

| Spot Probe | |
|---|---|
| Mg | 0.08 |
| Al | 0.38 |
| P | 0.54 |

TABLE L-4

(MAPO-43 LONG TABLE)

| $2\theta$ | d,(Å) | 100I/Io |
|---|---|---|
| 12.4 | 7.14–7.17 | 100 |
| 17.3–17.4 | 5.10–5.12 | 9–13 |
| 21.5–21.6 | 4.12–4.13 | 42–52 |
| 27.6–27.7 | 3.22–3.23 | 34–35 |
| 28.1 | 3.17–3.18 | 18–24 |
| 32.8–32.9 | 2.723–2.728 | 6–8 |
| 33.1–33.2 | 2.701–2.706 | 7–8 |
| 35.8–35.9 | 2.504–2.506 | 3 |
| 45.4 | 1.996–1.997 | 3–4 |
| 51.0–51.1 | 1.788–1.789 | 4–5 |
| 53.0 | 1.726–1.728 | 4 |

TABLE S-4

(MAPO-43 SHORT TABLE)

| $2\theta$ | d,(Å) | 100I/Io |
|---|---|---|
| 12.4 | 7.14–7.17 | 100 |
| 17.3–17.4 | 5.10–5.12 | 9–13 |
| 21.5–21.6 | 4.12–4.13 | 42–52 |
| 27.6–27.7 | 3.22–3.23 | 34–35 |
| 28.1 | 3.17–3.18 | 18–24 |
| 33.1–33.2 | 2.701–2.706 | 7–8 |

EXAMPLE 5

(Preparation of MAPO-50)

(a) A mixture was prepared by combining 46.2 grams of 85% orthophosphoric acid ($H_3PO_4$) and 53.2 grams of water to which was added 23.1 grams of a hydrated aluminum oxide (75.1 wt. % $Al_2O_3$, 24.9 wt. % $H_2O$). A solution prepared by dissolving 12.9 grams of magnesium acetate tetrahydrate ($Mg(CH_3CO_2)_2 \cdot 4H_2O$) in 100 grams of water was added to this mixture and the resulting mixture combined with 51 grams of di-n-propylamine ($C_6H_{15}N$) to form the final reaction mixture having a composition in terms of molar oxide ratios of:

2.5 $C_6H_{15}N$: 0.3 MgO: 0.85 $Al_2O_3$; 1.0 $P_2O_5$: 0.6 $CH_3COOH$: 50 $H_2O$

The reaction mixture was placed in a sealed stainless steel pressure vessel and heated in an oven at 150° C. at autogenous pressure for 144 hours. The solids were recovered by filtration, washed with water, and dried in air at room temperature. This material was pure and was subjected to x-ray and chemical analysis.

The x-ray powder diffraction pattern of the analyzed sample was characterized by the following data:

TABLE D

| $2\theta$ | d,(Å) | 100I/Io |
|---|---|---|
| 7.8 | 11.40 | 21 |
| 8.1 | 11.00 | 100 |
| 9.8 | 9.01 | 16 |
| 13.9 | 6.35 | 5 |
| 17.1 | 5.20 | 2 |
| 21.5 | 4.14 | 4 |
| 22.7 | 3.91 | 2 |
| 23.6 | 3.78 | 22 |
| 24.2 | 3.68 | 14 |
| 26.2 | 3.40 | 6 |
| 29.2 | 3.06 | 3 |
| 29.8 | 3.00 | 7 |
| 30.9 | 2.89 | 5 |
| 37.4 | 2.40 | 2 |

The chemical composition was found to be 23.5 wt. % $Al_2O_3$, 39.0 wt. % $P_2O_5$, 7.7 wt. % MgO, 10.8 wt. % C, 2.1 wt. % N, and 30.8 wt. % LOI. Expressed in terms of molar oxide ratios (anhydrous basis), the composition was:

0.55 $C_6H_{15}N$: 0.70 MgO: 0.84 $Al_2O_3$: 1.0 $P_2O_5$ which corresponds to an empirical chemical composition of:

0.13 $C_6H_{15}N$: $(Mg_{0.16}Al_{0.38}P_{0.46})O_2$

EDAX (energy dispersive analysis by x-ray) microprobe analysis, performed in conjunction with SEM (scanning electron microscope) study, on clean crystals with a crystal morphology characteristic of MAPO-50, gave the following analysis based on relative peak heights:

| Average of Spot Probes | |
|---|---|
| Mg | 0.12 |
| Al | 0.30 |
| P | 0.58 |

(b) A portion of the solids from part (a) supra was utilized to study adsorption capacity using a standard McBain-Bakr gravimetric adsorption apparatus. Measurements were made on a sample heated under vacuum at 400° C. to remove water and organic. The following data were obtained:

| Adsorbate | Kinetic Dia.,Å | Pressure Torr | Temp. °C. | Wt. % Adsorbed |
|---|---|---|---|---|
| $O_2$ | 3.46 | 700 | −183 | 7.2 |
| n-hexane | 4.30 | 88 | 24 | 3.4 |

TABLE L-5

| (MAPO-50 LONG TABLE) | | |
|---|---|---|
| $2\theta$ | d,(Å) | 100I/Io |
| 7.8 | 11.4 | 21 |
| 8.0–8.1 | 10.9–11.1 | 100 |
| 9.8 | 9.03 | 16–28 |
| 13.9 | 6.36 | 5 |
| 17.1–17.4 | 5.11–5.20 | 2 |
| 21.5 | 4.14 | 4–6 |
| 22.7 | 3.91 | 2 |
| 23.5–23.6 | 3.77–3.79 | 22–31 |
| 24.1–24.2 | 3.68–3.69 | 14–19 |
| 26.2 | 3.40 | 6–10 |
| 29.2 | 3.06 | 3–4 |
| 29.8 | 3.00 | 7–9 |
| 30.9 | 2.894 | 5–6 |
| 37.4 | 2.404 | 2–4 |

TABLE S-5

| (MAPO-50 SHORT TABLE) | | |
|---|---|---|
| $2\theta$ | d,(Å) | 100I/Io |
| 7.8 | 11.4 | 21 |
| 8.0–8.1 | 10.9–11.1 | 100 |
| 9.8 | 9.03 | 16–28 |
| 23.5–23.6 | 3.77–3.79 | 22–31 |
| 24.1–24.2 | 3.68–3.69 | 14–19 |
| 26.2 | 3.40 | 6–10 |

EXAMPLE 6

(Preparation of ZAPO-50)

(a) A mixture was prepared by combining 23.1 grams of 85% orthophosphoric acid ($H_3PO_4$) and 26.6 grams of water to which was added 11.6 grams of a hydrated aluminum oxide (75.1 wt. % $Al_2O_3$, 24.9 wt. % $H_2O$). A solution prepared by adding 6.6 grams zinc acetate dihydrate ($Zn(CH_3CO_2)_2$: 2 $H_2O$) in 50 grams of water was added to this mixture and the resulting mixture combined with 25.3 grams of di-n-propylamine ($C_6H_{15}N$) to form the final reaction mixture having a composition in terms of molar oxide ratios of:

2.5 $C_6H_{15}N$: 0.30 ZnO: 0.85 $Al_2O_3$: 1.00 $P_2O_5$: 0.6 $CH_3COOH$: 50 $H_2O$

The reaction mixture was placed in a sealed stainless steel pressure vessel and heated in an oven at 150° C. at autogenous pressure for 163 hours. The solids were recovered by filtration, washed with water, and dried in air at room temperature. The sample was subjected to chemical and x-ray analysis.

The x-ray powder diffraction pattern of the analyzed sample was characterized by the following data:

TABLE E

| $2\theta$ | d,(Å) | 100I/Io |
|---|---|---|
| 8.0 | 11.00 | 100 |
| 9.8 | 9.00 | 30 |

TABLE E-continued

| 2θ | d,(Å) | 100I/Io |
|---|---|---|
| 12.7 | 6.98 | 4 |
| 13.9 | 6.38 | 12 |
| 17.0 | 5.21 | 10 |
| 23.5 | 3.79 | 42 |
| 24.2 | 3.68 | 44 |
| 25.5 | 3.49 | 6 |
| 26.1 | 3.41 | 11 |
| 29.1 | 3.07 | 10 |
| 29.7 | 3.01 | 13 |
| 30.8 | 2.91 | 6 |
| 31.3 | 2.86 | 3 |
| 32.9 | 2.72 | 5 |
| 33.9 | 2.64 | 3 |
| 34.4 | 2.61 | 2 |
| 36.8 | 2.44 | 3 |
| 37.2 | 2.41 | 4 |
| 41.2 | 2.19 | 2 |
| 49.4 | 1.84 | 3 |
| 52.7 | 1.74 | 3 |

The chemical composition was found to be 20.2 wt. % $Al_2O_3$, 34.1 wt. % $P_2O_5$, 17.9 wt. % ZnO, 14.3 wt. % C, 3.0 wt. % N, and 28.1 wt. % LOI. Expressed in terms of molar oxide ratios (anhydrous basis) the composition was:

0.44 $C_6H_{15}N$: 0.44 ZnO: 0.83 $Al_2O_3$: 1.0 $P_2O_5$ which corresponds to an empirical chemical composition of:

0.19 $C_6H_{15}N$: $(Zn_{0.20} Al_{0.36} P_{0.44})O_2$

EDAX (energy dispersive analysis by x-ray) microprobe analysis, performed in conjunction with SEM (scanning electron microscope) study, on clean crystals with a crystal morphology characteristic of ZAPO-50, gave the following analysis based on relative peak heights:

| Average of Spot Probes | |
|---|---|
| Zn | 0.11 |
| Al | 0.27 |
| P | 0.62 |

TABLE L-6

(ZAPO-50 LONG TABLE)

| 2θ | d,(Å) | 100I/Io |
|---|---|---|
| 8.0 | 11.1 | 100 |
| 9.8 | 9.00–9.01 | 30 |
| 12.7 | 6.98–6.99 | 4 |
| 13.9 | 6.38–6.39 | 11–12 |
| 17.0 | 5.21 | 10 |
| 23.4–23.5 | 3.79–3.80 | 41–42 |
| 24.1–24.2 | 3.68–3.69 | 44–46 |
| 25.5 | 3.49–3.50 | 6–7 |
| 26.1 | 3.41–3.42 | 11–12 |
| 29.1 | 3.07 | 10 |
| 29.6–29.7 | 3.01–3.02 | 13–14 |
| 30.7–30.8 | 2.90–2.91 | 6 |
| 31.3 | 2.858 | 3–4 |
| 32.9 | 2.722 | 5–6 |
| 33.9 | 2.643–2.646 | 3 |
| 34.3–34.4 | 2.608–2.611 | 2–3 |
| 36.8 | 2.443–2.444 | 3 |
| 37.2 | 2.415–2.418 | 4 |
| 41.2 | 2.189–2.193 | 2–3 |
| 49.4 | 1.845–1.846 | 3 |

TABLE S-6

(ZAPO-50 SHORT TABLE)

| 2θ | d,(Å) | 100I/Io |
|---|---|---|
| 8.0 | 11.1 | 100 |
| 9.8 | 9.00–9.01 | 30 |
| 13.9 | 6.38–6.39 | 11–12 |
| 23.4–23.5 | 3.79–3.80 | 41–42 |
| 24.1–24.2 | 3.68–3.69 | 44–46 |
| 29.6–29.7 | 3.01–3.02 | 13–14 |

The MeAPO and FAPO structures of the present invention are, in general, hydrophilic and absorb water preferentially over common hydrocarbon molecules such as paraffinns, olefins and benzenoid aromatic species, e.g., benzene, xylenes and cumene. Thus the present metal aluminophosphates as a class are useful as desiccants in such adsorption separation/purification processes as natural gas drying, cracked gas drying. Water is also preferentially adsorbed over the so-called permanent gases such as carbon dioxide, nitrogen, oxygen and hydrogen. These metal aluminophosphates are therefore suitably employed in the drying of reformer hydrogen streams and in the drying of oxygen, nitrogen or air prior to liquefaction. In this respect the adsorptive properties of the present metal aluminophosphates appears to be quite similar to those of the low silica aluminosilicate zeolites, despite the fact that they exhibit, at best, a modest ion-exchange capacity.

The MeAPO and FAPO structures also exhibit novel surface selectivity characteristics which render them useful as catalyst or catalyst bases in a number of hydrocarbon conversion and oxidative combustion reactions. They can be impregnated or otherwise loaded with catalytically active metals by methods well known in the art and used, for example, in fabricating catalyst compositions having silica or alumina bases. Of the general class, those species having pores larger than about 5 angstroms are preferred for catalytic applications.

Among the hydrocarbon conversion reactions catalyzed by MeAPO and FAPO structures are cracking, hydrocracking, alkylation for both the aromatic and isoparaffin types, isomerization including xylene isomerization, polymerization, reforming, hydrogenation, dehydrogenation, transalkylation, dealkylation hydrodecyclization and dehydrocyclization.

Using MeAPO and/or FAPO-containing catalyst compositions which contain a hydrogenation promoter such as platinum or palladium, heavy petroleum residual stocks, cyclic stocks and other hydrocrackable charge stocks can be hydrocracked at temperatures in the range of 400° F. to 825° F. using molar ratios of hydrogen to hydrocarbon in the range of between 2 and 80, pressures between 10 and 3500 p.s.i.g., and a liquid hourly space velocity (LHSV) of from 0.1 to 20, preferably 1.0 to 10.

The MeAPO and/or FAPO-containing catalyst compositions employed in hydrocracking are also suitable for use in reforming processes in which the hydrocarbon feedstocks contact the catalyst at temperatures of from about 700° C. to 1000° F., hydrogen pressures of from 100 to 500 p.s.i.g., LHSV values in the range of 0.1 to 10 and hydrogen to hydrocarbon molar ratios in the range of 1 to 20, preferably between 4 and 12.

These same catalysts, i.e. those containing hydrogenation promoters, are also useful in hydroisomerization processes in which feedstocks such as normal paraffins are converted to saturated branched chain isomers. Hydroisomerization is carried out at a temperature of from about 200° F. to 600° F., preferably 300° F. to 550° F. with an LHSV value of from about 0.2 to 1.0. Hydrogen is supplied to the reactor in admixture with the hydrocarbon feedstock in molar proportions (H/Hc) of between 1 and 5.

At somewhat higher temperatures, i.e. from about 650° F. to 1000° F., preferably 850° F. to 950° F. and usually at somewhat lower pressures within the range of about 15 to 50 p.s.i.g., the same catalyst compositions are used to hydroisomerize normal paraffins. Preferably the paraffin feedstock comprises normal paraffins having a carbon number range of $C_7$-$C_{20}$. Contact time between the feedstock and the catalyst is generally relatively short to avoid undesirable side reactions such as olefin polymerization and paraffin cracking. LHSV values in the range of 0.1 to 10, preferably 1.0 to 6.0 are suitable.

The unique crystal structure of the MeAPO and FAPO catalysts and their availability in a form totally void of alkali metal content favor their use in the conversion of alkylaromatic compounds, particularly the catalytic disproportionation of toluene, ethylene, trimethyl benzenes, tetramethyl benzenes and the like. In the disproportionation process isomerization and transalkylation can also occur. Group VII noble metal adjuvants alone or in conjunction with Group VI-B metals such as tungsten, molybdenum and chromium are preferably included in the catalyst composition in amounts of from about 3 to 15 weight-% of the overall composition. Extraneous hydrogen can, but need not, be present in the reaction zone which is maintained at a temperature of from about 400° to 750° F., pressures in the range of 100 to 200 p.s.i.g. and LHSV values in the range of 0.1 to 15.

Catalytic cracking processes are preferably carried out with MeAPO and/or FAPO compositions using feedstocks such as gas oils, heavy naphthas, deasphalted crude oil residue, etc., with gasoline being the principal desired product. Temperature conditions of 850° to 1100° F., LHSV values of 0.5 to 10 and pressure conditions of from about 0 to 50 p.s.i.g. are suitable.

Dehydrocyclization reactions employing paraffinic hydrocarbon feedstocks, preferably normal paraffins having more than 6 carbom atoms, to form benzene, xylenes, toluene and the like are carried out using essentially the same reaction conditions as for catalytic cracking. For these reactions it is preferred to use the MeAPO or FAPO catalyst in conjunction with a Group VIII non-noble metal cation such as cobalt and nickel.

In catalytic dealkylation wherein it is desired to cleave paraffinic side chains from aromatic nuclei without substantially hydrogenating the ring structure, relatively high temperatures in the range of about 800°-1000° F. are employed at moderate hydrogen pressures of about 300-1000 p.s.i.g. other conditions being similar to those described above for catalytic hydrocracking. Preferred catalysts are of the same type described above in connection with catalytic dehydrocyclization. Particularly desirable dealkylation reactions contemplated herein include the conversion of methylnaphthalene to naphthalene and toluene and/or xylenes to benzene.

In catalytic hydrofining, the primary objective is to promote the selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Feedstocks include gasoline fractions, kerosenes, jet fuel fractions, diesel fractions, light and heavy gas oils, deasphalted crude oil residua and the like any of which may contain up to about 5 weight-percent of sulfur and up to about 3 weight-percent of nitrogen.

Similar conditions can be employed to effect hydrofining, i.e., denitrogenation and desulfurization, of hydrocarbon feeds containing substantial proportions of organonitrogen and organosulfur compounds. It is generally recognized that the presence of substantial amounts of such constituents markedly inhibits the activity of catalysts of hydrocracking. Consequently, it is necessary to operate at more extreme conditions when it is desired to obtain the same degree of hydrocracking conversion per pass on a relatively nitrogenous feed than are required with a feed containing less organonitrogen compounds. Consequently, the conditions under which denitrogenation, desulfurization and/or hydrocracking can be most expeditiously accomplished in any given situation are necessarily determined in view of the characteristics of the feedstocks in particular the concentration of organonitrogen compounds in the feedstock. As a result of the effect of organonitrogen compounds on the hydrocracking activity of these compositions it is not at all unlikely that the conditions most suitable for denitrogenation of a given feedstock having a relatively high organonitrogen content with minimal hydrocracking, e.g., less than 20 volume percent of fresh feed per pass, might be the same as those preferred for hydrocracking another feedstock having a lower concentration of hydrocracking inhibiting constituents, e.g., organonitrogen compounds. Consequently, it has become the practice in this art to establish the conditions under which a certain feed is to be contacted on the basis of preliminary screening tests with the specific catalyst and feedstock.

Isomerization reactions are carried out under conditions similar to those described above for reforming, using somewhat more acidic catalysts. Olefins are preferably isomerized at temperatures of 500°-900° F., while paraffins, naphthenes and alkyl aromatics are isomerized at temperatures of 700°-1000° F. Particularly desirable isomerization reactions contemplated herein include the conversion of n-heptene and/or n-octane to isoheptanes, iso-octanes, butane to iso-butane, methylcyclopentane to cyclohexane, meta-xylene and/or ortho-xylene to paraxylene, 1-butene to 2-butene and/or isobutene, n-hexene to isohexene, cyclohexene to methylcyclopentene, etc. The preferred cation form is a combinatio of the MeAPO with polyvalent metal compounds (such as sulfides) of metals of Group II-A, Group II-B and rare earth metals. For alkylation and dealkylation processes the MeAPO compositions having pores of at least 5A are preferred. When employed for dealkylation of alkyl aromatics, the temperature is usually at least 350° F. and ranges up to a temperature at which substantial cracking of the feedstock or conversion products occurs, generally up to about 700° F. The temperature is preferably at least 450° F. and not greater than the critical temperature of the compound undergoing dealkylation. Pressure conditions are applied to retain at least the aromatic feed in the liquid state. For alkylation the temperature can be as low as 250° F. but is preferably at least 350° F. In alkylation benzene, toluene and xylene, the preferred alkylating agents are olefins such as ethylene and propylene.

What is claimed is:

1. Crystalline metal aluminophosphates having a three-dimensional microporous framework structure of $MO_2$, $AlO_2$ and $PO_2$ tetrahedral units and having an empirical chemical composition on an as synthesized, anhydrous basis expressed by the formula $$mR:(M_xAl_yP_z)O_2$$

wherein "R" represents at least one organic templating agent present in the intracrystalline pore system: "m" represents the moles of "R" present per mole of $(M_xAl_yP_z)O_2$ and has a value of from zero to 0.3, "M" represents at least one metal of the group magnesium, manganese, zinc, iron and cobalt, "x", "y" and "z" represent the mole fraction of the metal "M", aluminum and phosphorus respectively present as tetrahedral oxides, said mole fractions being such that they are within the tetragonal compositional area defined by points A, B, C and D of the ternary diagram which is FIG. 1 of the drawings and having an X-ray diffraction pattern of one of Table 43S or Table 50S

TABLE 43S

| 2θ | d, (Å) | Relative Intensity |
|---|---|---|
| 12.4 | 7.14–7.17 | VS |
| 17.3–17.4 | 5.10–5.12 | W |
| 21.5–21.6 | 4.12–4.13 | M |
| 27.6–27.7 | 3.22–3.23 | W–M |
| 28.1–28.2 | 3.16–3.18 | W |
| 33.1–33.2 | 2.701–2.706 | VW |

TABLE 50S

| 2θ | d, (Å) | Relative Intensity |
|---|---|---|
| 7.8 | 11.4 | W–VW |
| 8.0–8.1 | 10.9–11.1 | VS |
| 9.8–9.9 | 8.93–9.03 | W |
| 23.5–23.6 | 3.77–3.79 | W–M |
| 24.1–24.3 | 3.66–3.69 | W |
| 26.2 | 3.40 | VW |

2. Crystalline metal aluminophosphates according to claim 1 wherein the mole fractions of "M", aluminum, and phosphorus present as tetrahedral oxides are within the tetragonal compositional area defined by the points a, b, c and d of the ternary diagram which is FIG. 2 of the drawings.

3. Crystalline metal aluminophosphates according to claim 1 wherein "m" has a value of from 0.02 to 0.03.

4. Crystalline metal aluminophosphates according to claim 1 wherein "M" represents zinc.

5. Crystalline metal aluminophosphates according to claim 1 wherein "M" represents manganese.

6. Crystalline metal aluminophosphates according to claim 1 wherein "M" represents iron.

7. Crystalline metal aluminophosphates according to claim 1 wherein "M" represents magnesium.

8. Crystalline metal aluminophosphates according to claim 1 wherein "M" represents cobalt.

9. Crystalline metal aluminophosphates according to claim 1 having a characteristic X-ray powder diffraction pattern which contains at least the d-spacings set forth in Table 43S

TABLE 43S

| 2θ | d, (Å) | Relative Intensity |
|---|---|---|
| 12.4 | 7.14–7.17 | VS |
| 17.3–17.4 | 5.10–5.12 | W |
| 21.5–21.6 | 4.12–4.13 | M |
| 27.6–27.7 | 3.22–3.23 | W–M |
| 28.1–28.2 | 3.16–3.18 | W |
| 33.1–33.2 | 2.701–2.706 | VW. |

10. Crystalline metal aluminophosphates according to claim 1 having a characteristic X-ray powder diffraction pattern which contains at least the d-spacings set forth in Table 50S

TABLE 50S

| 2θ | d, (Å) | Relative Intensity |
|---|---|---|
| 7.8 | 11.4 | W–VW |
| 8.0–8.1 | 10.9–11.1 | VS |
| 9.8–9.9 | 8.93–9.03 | W |
| 23.5–23.6 | 3.77–3.79 | W–M |
| 24.1–24.3 | 3.66–3.69 | W |
| 26.2 | 3.40 | VW. |

11. Crystalline metal aluminophosphates according to claim 1 having a characteristic X-ray powder diffraction pattern which contains at least the d-spacings set forth in Table L-1.

TABLE L-1

| (CoAPO-43 LONG TABLE) | | |
|---|---|---|
| 2θ | d, (Å) | Relative Intensity |
| 12.4 | 7.14–7.15 | 100 |
| 17.3–17.4 | 5.11 | 7–10 |
| 21.5–21.6 | 4.12 | 39–40 |
| 27.6–27.7 | 3.22–3.23 | 38–40 |
| 28.2 | 3.16 | 19–20 |
| 32.8–32.9 | 2.726–2.727 | 9–11 |
| 33.1–33.1 | 2.700–2.702 | 7–8 |
| 45.4–45.5 | 1.995–1.998 | 3–4 |
| 51.1 | 1.787 | 4–5 |
| 53.1 | 1.724 | 5. |

12. Crystalline metal aluminophosphates according to claim 1 having a characteristic X-ray powder diffraction pattern which contains at least the d-spacings set forth in Table L-2.

TABLE L-2

| (CoAPO-50 LONG TABLE) | | |
|---|---|---|
| 2θ | d, (Å) | Relative Intensity |
| 8.10 | 10.9 | 99–100 |
| 9.86–9.87 | 8.97 | 38–100 |
| 14.0–14.5 | 6.12–6.33 | 1–4 |
| 23.6 | 3.77 | 6–10 |
| 24.2–24.3 | 3.66–3.68 | 7–12 |
| 26.2 | 3.40 | 2–4 |
| 29.8 | 3.00 | 2–5 |
| 37.4–37.5 | 2.40 | 3–5 |
| 49.7 | 1.83 | 2–4. |

13. Crystalline metal aluminophosphates according to claim 1 having a characteristic X-ray powder diffraction pattern which contains at least the d-spacings set forth in Table L-4

TABLE L-4
(MAPO-43 LONG TABLE)

| 2θ | d, (Å) | Relative Intensity |
|---|---|---|
| 12.4 | 7.14–7.17 | 100 |
| 17.3–17.4 | 5.10–5.12 | 9–13 |
| 21.5–21.6 | 4.12–4.13 | 42–52 |
| 27.6–27.7 | 3.22–3.23 | 34–35 |
| 28.1 | 3.17–3.18 | 18–24 |
| 32.8–32.9 | 2.723–2.728 | 6–8 |
| 33.1–33.2 | 2.701–2.706 | 7–8 |
| 35.8–35.9 | 2.504–2.506 | 3 |
| 45.4 | 1.996–1.997 | 3–4 |
| 51.0–51.1 | 1.788–1.789 | 4–5 |
| 53.0 | 1.726–1.728 | 4. |

14. Crystalline metal aluminophosphates according to claim 1 having a characteristic X-ray powder diffraction pattern which contains at least the d-spacings set forth in Table L-5

TABLE L-5
(MAPO-50 LONG TABLE)

| 2θ | d, (Å) | Relative Intensity |
|---|---|---|
| 7.8 | 11.4 | 21 |
| 8.0–8.1 | 10.9–11.1 | 100 |
| 9.8 | 9.03 | 16–28 |
| 13.9 | 6.36 | 5 |
| 17.1–17.4 | 5.11–5.20 | 2 |
| 21.5 | 4.14 | 4–6 |
| 22.7 | 3.91 | 2 |
| 23.5–23.6 | 3.77–3.79 | 22–31 |
| 24.1–24.2 | 3.68–3.69 | 14–19 |
| 26.2 | 3.40 | 6–10 |
| 29.2 | 3.06 | 3–4 |
| 29.8 | 3.00 | 7–9 |
| 30.9 | 2.894 | 5–6 |
| 37.4 | 2.404 | 2–4. |

15. Crystalline metal aluminophosphates according to claim 1 having a characteristic X-ray powder diffraction pattern which contains at least the d-spacings set forth in Table L-6

TABLE L-6
(ZAPO-50 LONG TABLE)

| 2θ | d, (Å) | Relative Intensity |
|---|---|---|
| 8.0 | 11.1 | 100 |
| 9.8 | 9.00–9.01 | 30 |
| 12.7 | 6.98–6.99 | 4 |
| 13.9 | 6.38–6.39 | 11–12 |
| 17.0 | 5.21 | 10 |
| 23.4–23.5 | 3.79–3.80 | 41–42 |
| 24.1–24.2 | 3.68–3.69 | 44–46 |
| 25.5 | 3.49–3.50 | 6–7 |
| 26.1 | 3.41–3.42 | 11–12 |
| 29.1 | 3.07 | 10 |
| 29.6–29.7 | 3.01–3.02 | 13–14 |
| 30.7–30.8 | 2.90–2.91 | 6 |
| 31.3 | 2.858 | 3–4 |
| 32.9 | 2.722 | 5–6 |
| 33.9 | 2.643–2.646 | 3 |
| 34.3–34.4 | 2.608–2.611 | 2–3 |
| 36.8 | 2.443–2.444 | 3 |
| 37.2 | 2.415–2.418 | 4 |
| 41.2 | 2.189–2.193 | 2–3 |
| 49.4 | 1.845–1.846 | 3. |

16. Crystalline metal aluminophosphates according to claim 1 having a characteristic X-ray powder diffraction pattern which contains at least the d-spacings set forth in Table S-1

TABLE S-1
(CoAPO-43 SHORT TABLE)

| 2θ | d, (Å) | Relative Intensity |
|---|---|---|
| 12.4 | 7.14–7.15 | 100 |
| 17.3–17.4 | 5.11 | 7–10 |
| 21.5–21.6 | 4.12 | 39–40 |
| 27.6–27.7 | 3.22–3.23 | 38–40 |
| 28.2 | 3.16 | 19–20 |
| 32.8–32.9 | 2.726–2.727 | 9–11. |

17. Crystalline metal aluminophosphates according to claim 1 having a characteristic X-ray powder diffraction pattern which contains at least the d-spacings set forth in Table S-2

TABLE S-2
(CoAPO-50 SHORT TABLE)

| 2θ | d, (Å) | Relative Intensity |
|---|---|---|
| 8.10 | 10.9 | 99–100 |
| 9.86–9.87 | 8.97 | 38–100 |
| 23.6 | 3.77 | 6–10 |
| 24.2–24.3 | 3.66–3.68 | 7–12 |
| 29.8 | 3.00 | 2–5 |
| 37.4–37.5 | 2.40 | 3–5. |

18. Crystalline metal aluminophosphates according to claim 1 having a characteristic X-ray powder diffraction pattern which contains at least the d-spacings set forth in Table S-4

TABLE S-4
(MAPO-43 SHORT TABLE)

| 2θ | d, (Å) | Relative Intensity |
|---|---|---|
| 12.4 | 7.14–7.17 | 100 |
| 17.3–17.4 | 5.10–5.12 | 9–13 |
| 21.5–21.6 | 4.12–4.13 | 42–52 |
| 27.6–27.7 | 3.22–3.23 | 34–35 |
| 28.1 | 3.17–3.18 | 18–24 |
| 33.1–33.2 | 2.701–2.706 | 7–8. |

19. Crystalline metal aluminophosphates according to claim 1 having a characteristic X-ray powder diffraction pattern which contains at least the d-spacings set forth in Table S-5

TABLE S-5
(MAPO-50 SHORT TABLE)

| 2θ | d, (Å) | Relative Intensity |
|---|---|---|
| 7.8 | 11.4 | 21 |
| 8.0–8.1 | 10.9–11.1 | 100 |
| 9.8 | 9.03 | 16–28 |
| 23.5–23.6 | 3.77–3.79 | 22–31 |
| 24.1–24.2 | 3.68–3.69 | 14–19 |
| 26.2 | 3.40 | 6–10. |

20. Crystalline metal aluminophosphates according to claim 1 having a characteristic X-ray powder diffraction pattern which contains at least the d-spacings set forth in Table S-6

TABLE S-6
(ZAPO-50 SHORT TABLE)

| 2θ | d, (Å) | Relative Intensity |
|---|---|---|
| 8.0 | 11.1 | 100 |
| 9.8 | 9.00–9.01 | 30 |
| 13.9 | 6.38–6.39 | 11–12 |
| 23.4–23.5 | 3.79–3.80 | 41–42 |
| 24.1–24.2 | 3.68–3.69 | 44–46 |
| 29.6–29.7 | 3.01–3.02 | 13–14. |

* * * * *